(12) United States Patent
Goebel

(10) Patent No.: US 6,960,404 B2
(45) Date of Patent: Nov. 1, 2005

(54) EVAPORATIVE COOLED FUEL CELL

(75) Inventor: Steven G. Goebel, Victor, NY (US)

(73) Assignee: General Motors Corporation, Detroit, MI (US)

(*) Notice: Subject to any disclaimer, the term of this patent is extended or adjusted under 35 U.S.C. 154(b) by 295 days.

(21) Appl. No.: 10/375,392

(22) Filed: Feb. 27, 2003

(65) Prior Publication Data

US 2004/0170878 A1 Sep. 2, 2004

(51) Int. Cl.[7] .......................... H01M 2/14; H01M 8/04
(52) U.S. Cl. .............................................. 429/39; 429/26
(58) Field of Search ........................... 429/26, 34, 39

(56) References Cited

U.S. PATENT DOCUMENTS

| | | | | |
|---|---|---|---|---|
| 4,769,297 A | | 9/1988 | Reiser et al. ................ | 429/17 |
| 5,322,744 A | * | 6/1994 | Koseki ......................... | 429/13 |
| 5,503,944 A | | 4/1996 | Meyer et al. ................ | 429/13 |
| 5,840,414 A | | 11/1998 | Bett et al. ................... | 428/307.7 |
| 5,853,909 A | | 12/1998 | Reiser ......................... | 429/13 |
| 6,066,408 A | | 5/2000 | Vitale et al. ................ | 429/26 |
| 6,117,577 A | | 9/2000 | Wilson ......................... | 429/17 |
| 6,197,442 B1 | | 3/2001 | Gorman ....................... | 429/13 |
| 6,258,476 B1 | | 7/2001 | Cipollini ..................... | 429/34 |
| 6,303,245 B1 | | 10/2001 | Nelson ........................ | 429/34 |
| 6,555,262 B1 | * | 4/2003 | Kaiser et al. ................ | 429/34 |

* cited by examiner

Primary Examiner—Patrick Joseph Ryan
Assistant Examiner—Thomas H. Parsons
(74) Attorney, Agent, or Firm—Harness, Dickey & Pierce, P.L.C.

(57) ABSTRACT

The present invention relates to an electrochemical cell having the separator assembly that comprises a fluid distribution means comprising wicking material on the cathode side of a membrane electrode assembly (MEA). The wicking material transports liquids internally within the fuel cell; promotes humidification of the membrane; and provides a self-regulating cooling system for the fuel cell. The wicking material further forms gas flow channels for introducing gases to and from the MEA. Other preferred aspects of the present invention include methods of cooling the fuel cell by evaporation and/or vaporization at the cathode side.

21 Claims, 6 Drawing Sheets

EVAPORATIVE COOLED FUEL CELL

FIELD OF THE INVENTION

The present invention relates to PEM fuel cells and, more particularly, to evaporative cooled fuel cells and methods for operating the same.

BACKGROUND OF THE INVENTION

Fuel cells have been proposed as a power source for electric vehicles and other applications. An exemplary fuel cell has a membrane electrode assembly (MEA) with catalytic electrodes and a proton exchange membrane (PEM) sandwiched between the electrodes. Water (also known as product water) is generated at the cathode electrode based on the electrochemical reactions between hydrogen and oxygen occurring within the MEA. Efficient operation of a fuel cell depends on the ability to provide effective water management in the system, and more specifically to control transport of water away from generation sites on the cathode, and to recover and recycle water in the system.

The physical state of the product water generated in the MEA depends on the temperature and pressure at which the electrochemical reaction occurs. Generally the product water will be vapor at higher temperatures and lower pressures, and liquid at lower temperatures and higher pressures. Therefore, it is possible that the product water exists as liquid when the fuel cell stack is cooler, and gradually transitions to water vapor when the stack is at higher operating temperatures.

At full operating temperature, excess heat must be removed from the system. The PEM is often sensitive to high temperatures, such that the fuel cell operating conditions must be maintained below these degradation temperatures. Present methods of removing heat from the fuel cell include a coolant loop that circulates between plates within a bipolar plate assembly. This cooling system is physically separated from the fuel cell operations and relies on thermal conductivity of the metal elements, or barriers, to transfer heat into the coolant, and constant pumping to provide the necessary circulation. The coolant is a heat sink and can be subsequently regenerated or removed from the cooling loop. There is a need to optimize fuel cell performance by cooling a fuel cell while eliminating such coolant loops and improving the management of water.

SUMMARY OF THE INVENTION

The present invention provides a separator assembly for an electrochemical cell which has an anode and a cathode. The assembly comprises an impermeable electrically conductive layer having a major surface facing the cathode. The assembly also comprises a fluid distribution means between the electrically conductive layer and the cathode, the fluid distribution means defining gas flow channels, and comprising liquid wicking material and a header comprising a liquid reservoir in contact with a proximal end of the fluid distribution means. The fluid distribution means and the header are constructed and arranged to provide movement of liquid from the liquid reservoir to and through the fluid distribution means and toward a distal end of the fluid distribution means.

Another aspect of the present invention includes methods for cooling an electrochemical fuel cell comprising: introducing reactant gases to respective anode and cathode sides of said fuel cell and water to the cathode side of said fuel cell; conducting an electrochemical reaction in the membrane electrode assembly (MEA) of the fuel cell thereby generating heat; transporting water away from wet areas on the cathode side by means of wicking material interspersed between flow channels for the reactant gases; and transferring the transported water to relatively dry and preferably hot areas of the cathode side by means of the wicking material. Thus, the liquid water is evaporated from the wicking material by the generated heat, thereby cooling the electrochemical cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates a separator assembly in an electrochemical fuel cell that provides integrated water management. Such water management functions include: moving water away from the wet areas of the cathode side of the fuel cell, where it is generated as a product in the fuel cell electrochemical reaction; transporting water internally to any relatively dry areas along the cathode side; providing cooling for the fuel cell; and humidifying the proton exchange membrane (PEM) of the membrane electrode assembly (MEA). The separator assembly according to the present invention comprises a fluid distribution means, preferably comprising a wicking material, that defines gas flow channels. The wicking material facilitates water management within the fuel cell. The wicking material preferably transports liquid by wicking (i.e. capillary action) alone, and does not require external pumping for such liquid transport.

Figure 1:
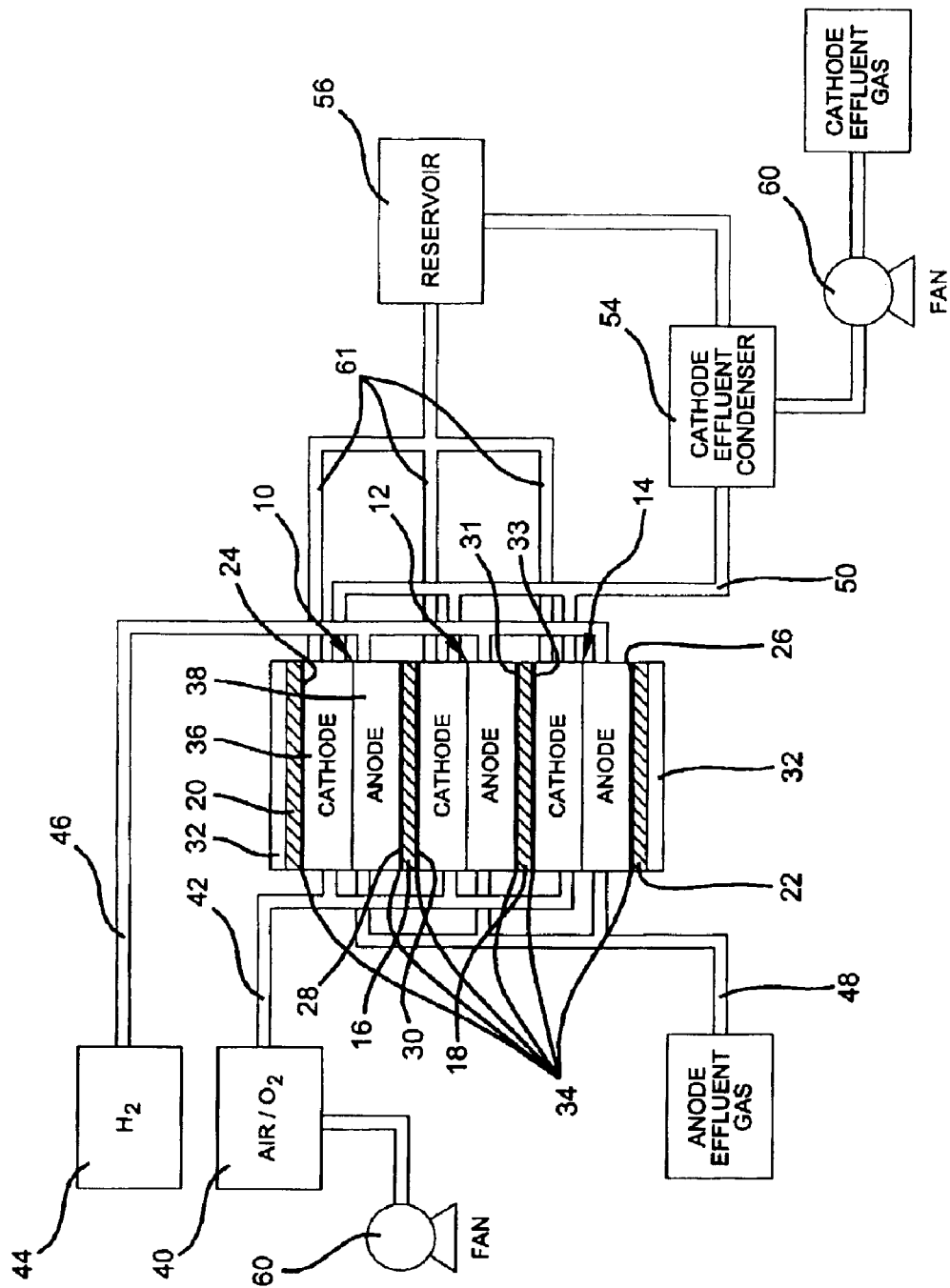
FIG. 1 is a schematic illustration of three cells in a stack in an exemplary fuel cell system.

Referring generally to FIG. 1, three individual proton exchange membrane (PEM) fuel cells according to one preferred embodiment of the present invention are connected to form a stack. Each PEM fuel cell has a membrane-electrode-assemblies (MEA) 10,12,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 each active side 28,30 respectively facing a separate MEA 10,12 with opposite charges that are separated, hence the so-called "bipolar" plate. As described herein, the fuel cell stack has conductive bipolar separator plates in a stack with multiple fuel cells, however the present invention is equally applicable to conductive separator plates within a stack having only a single fuel cell.

The MEAs 10,12,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 10,12,14. Nonconductive gaskets or seals (not shown) provide seals and electrical insulation between the several components of the fuel cell stack. Gas-permeable conductive diffusion media 34 press up against the electrode faces of the MEAs 10,12,14. When the fuel cell stack is assembled, the conductive gas diffusion layers 34 assist in even distribution of gas across the electrodes of the MEAs 10,12,14 and also assist in conducting electrical current throughout the stack.

Oxygen is supplied to the cathode side 36 of each fuel cell 10,12,14 in the stack from storage tank 40 via appropriate supply plumbing 42, while hydrogen is supplied to the anode side 38 of the fuel cell from storage tank 44, via appropriate supply plumbing 46. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 10,12,14 are provided. Gas flow into and out of the stack is typically facilitated by fans 60, such as those shown in the exemplary configuration of FIG. 1. Any means of transporting fluids into and out of the stack are feasible, and the configuration and number of fans shown is merely exemplary and not limiting.

As shown in FIG. 1, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 10,12,14 by interconnecting the reservoir 56 to the fuel cells in the stack. A pump (not shown) may optionally be included in the system to facilitate the transport of the liquid from the reservoir 56 to the stack, or through other areas of the system.

Figure 2:
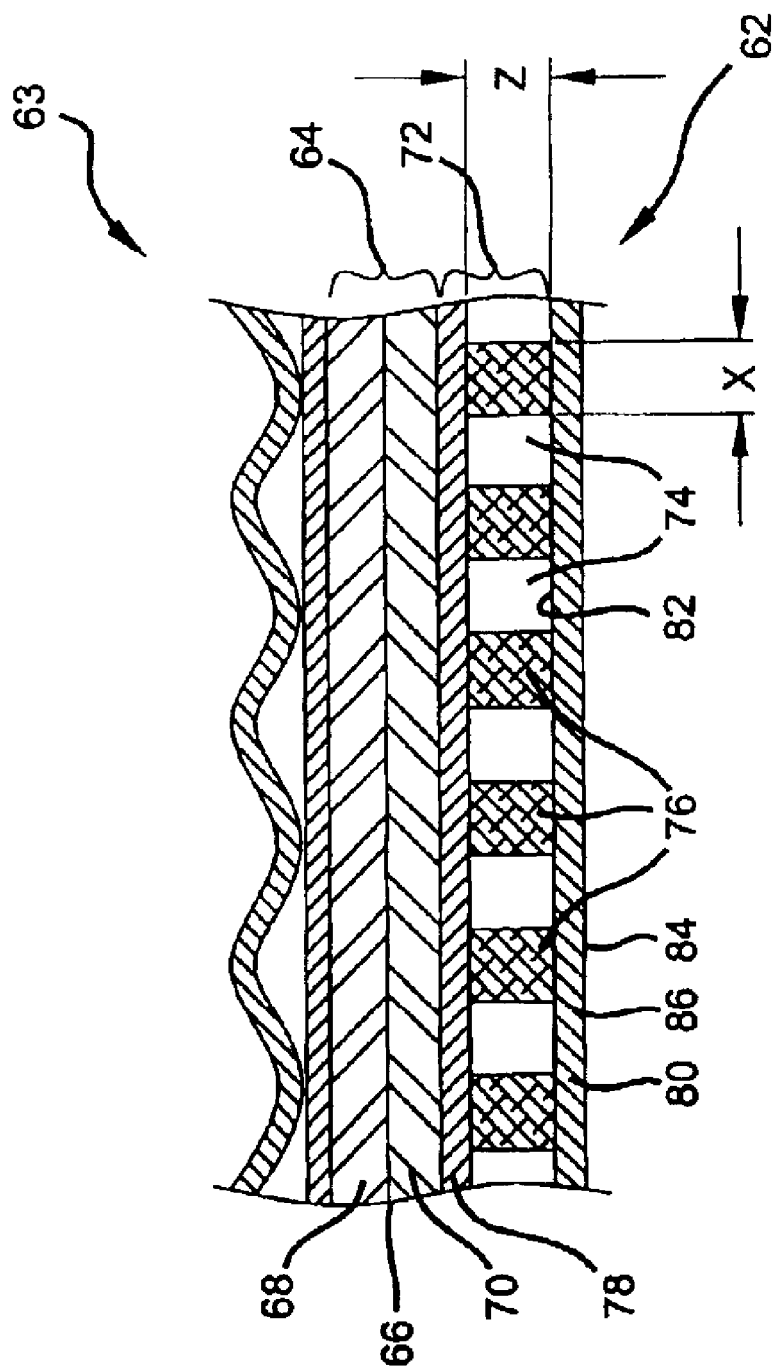
FIG. 2 is a partial cross-sectional view of a fuel cell showing a preferred embodiment of a separator assembly with a fluid distribution means on a cathode side of a membrane electrode assembly (MEA)

As shown in FIG. 2, a detailed view of an exemplary separator plate assembly 62 in a fuel cell 63 is shown adjacent to an exemplary MEA 64. The MEA 64 comprises a membrane 66 sandwiched between two catalytic electrodes, an anode 68 and a cathode 70. A fluid distribution means 72 is adjacent to the cathode 70, and defines gas flow channels 74 for delivering gaseous oxidant to the MEA 64 for reaction. The fluid distribution means 72 comprises a wicking material where the gas flow channels 74 are formed therein, such that the wicking material forms columns or rows 76. The fluid distribution means 72 also optionally comprises a porous diffusion media 78 (as shown in FIG. 2), directly adjacent to the cathode 70 to facilitate even gas distribution over the MEA 64 after traveling through the gas flow channels 74. The fluid distribution means 72 is adjacent to an impermeable electrically conductive element layer 80 along a side opposite to the cathode 70. The electrically conductive layer 80 has a major surface 82 which faces the cathode 70. The major surface 82 is electrically active in the area which coincides to the area occupied by the MEA 64, and conducts the electrical charge from the cathode 70 side of the fuel cell. Optionally, the electrically conductive layer 80 may be a bipolar plate, where the major surface 82 faces a cathode 70, and the opposite surface 84 faces an anode of another fuel cell.

The membrane 66 is a proton exchange membrane (PEM), which typically comprises an ionic exchange resin, such as a perfluorosulfonate ionomer membrane. One such commercially available membrane is the proton conductive membrane sold by E. I. DuPont De Nemours & Co. under the trade name NAFION®. The anode 68 and cathode 70 typically comprise porous materials with catalytic particles distributed therein, to facilitate the electrochemical reaction of the oxygen with the hydrogen.

The impermeable electrically conductive layer 80 comprises a solid conductive body 86. The impermeable electrically conductive layer 80 is impervious to both fluid and gas flow, thus providing a physical barrier between the several fuel cells, or the terminal end of the stack. The impermeable electrically conductive layer 80 may be constructed of conductive materials known in the art, such as for example, aluminum, titanium, stainless steels, and their alloys, as well as carbon composites. Preferably, the conductive impermeable layer 80 is adjacent and attached to the fluid distribution means 72.

In addition to the liquid wicking material 76, the fluid distribution layer 72 may further comprise the porous, conductive, gas diffusion media sub-layer 78 closest to the cathode 70. Such conductive gas diffusion media layers 78 are well known in the art, such as the commercially available Toray® graphite-fiber paper made by Toray Carbon Fibers America, Inc.

During fuel cell operation, hydrogen gas is introduced at the anode 68, where the hydrogen ($H_2$) is split into two protons ($H^+$), freeing an electron. The protons migrate across the membrane to the cathode side 70. Oxygen or air is introduced at the cathode side 70, where it is flows into the porous electrode. Catalyst particles within the cathode 70 facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the PEM 66 through the MEA 64, in effect decreasing or ceasing any reactions occurring at the MEA 64. A preferred embodiment of the present invention provides the fluid distribution means 72 adjacent to the cathode 70 that facilitates water transportation away from the cathode 70, while further humidifying the PEM 66, and cooling the fuel cell 63.

Figure 3:
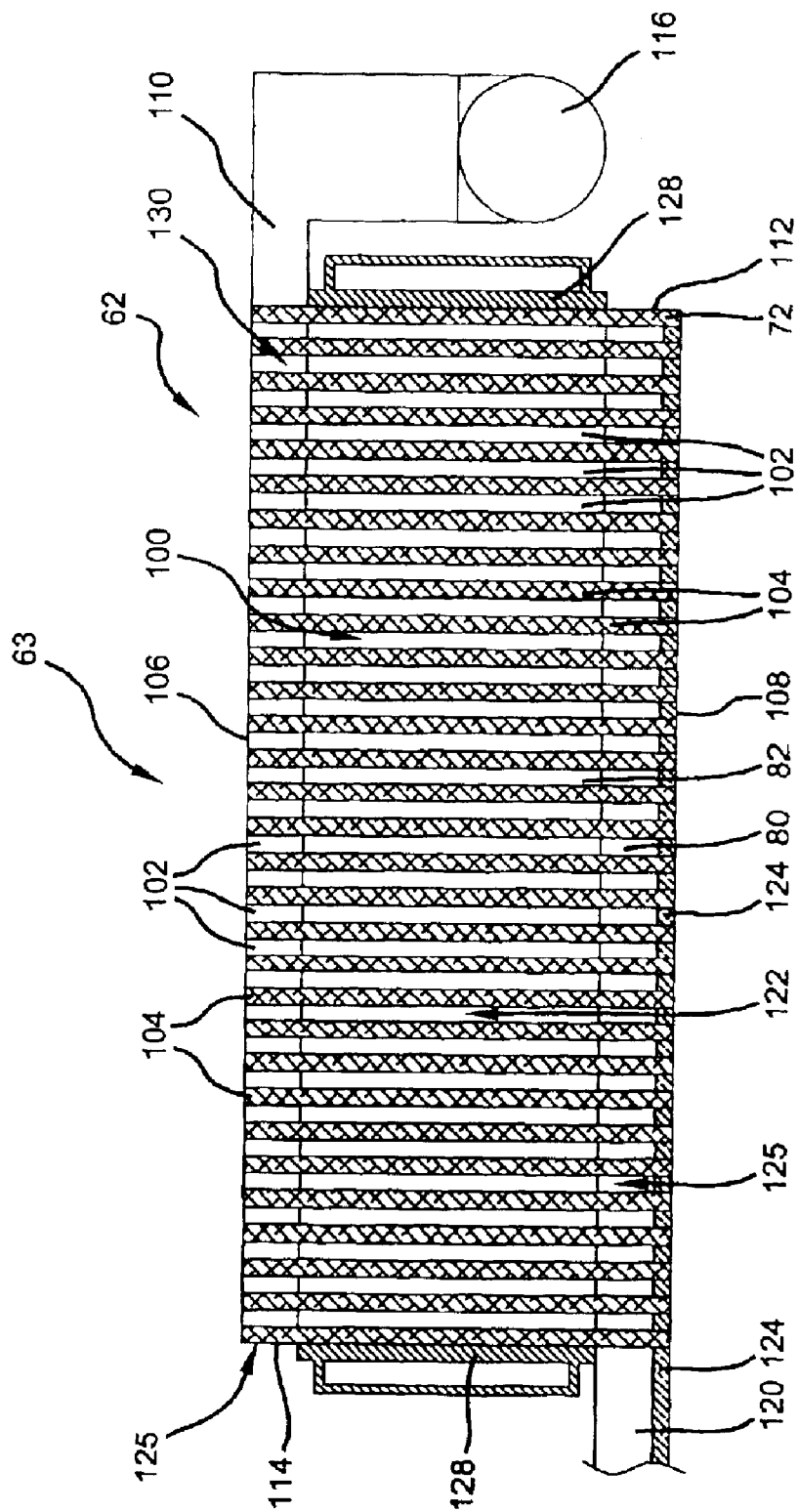
FIG. 3 is a plan view of a fluid distribution means on a side facing a cathode of a separator assembly.

FIG. 3 depicts an overhead view of the exemplary separator plate assembly 62 along a cathode side 70 having the fluid distribution means 72 according to one preferred embodiment of the present invention. The separator plate assembly 62 has a "flow field" 100 in the fluid distribution means 72 through which the fuel cell's reactant gases (i.e., air or $O_2$) flow. The flow field 100 has a plurality of gas flow channels 102 defined by a plurality of rows of wicking material 104 that extend from a distal end 106 of the separator plate assembly 62 to a proximal end 108. Thus, the gas flow channels 102 also extend from the distal end 106 to the proximal end 108 of the separator plate assembly 62. The gas flow channels 102 are connected to a cathode inlet manifold duct 110 that extends across the distal end 106 from a first side 112 to a second side 114 of the separator plate 62. The inlet manifold duct 110 delivers gas to each flow channel 102. A cathode inlet fan 116 is shown external to the fuel cell 63 that transports cathode inlet air/oxygen into the cathode inlet manifold duct 110. The gas flow channels 102 terminate at the proximal side 108 of the separator plate assembly 62 at a cathode effluent outlet duct 120, which extends from the first to second sides 112, 114 and transports cathode exhaust gases, or effluent out of the stack (via cathode exhaust plumbing 50 of FIG. 1). Cathode effluent 50 may comprise, for example, excess air not used in reaction, nitrogen, vapors (including water vapor), and other diluents or additives.

The wicking material rows 104 are attached to the major surface 82 of the underlying conductive layer 80. The plurality of rows of wicking material 104 extend beyond the boundaries of an electrically active area 122 (which coincides to the electrically active area defined by the internal area the MEA 64 occupies along the major surface 82). A header 124 extends along the proximal end 108 of the separator plate assembly 62 where it is in fluid communication with each wicking material row 104. The header 124 is further in fluid communication with the return supply conduit 61 connected to the liquid reservoir 56 (FIG. 1). Preferably, the header 124 comprises an electrically non-conductive wicking material that transports fluids by the same capillary force/wicking action as the wicking material rows 104. The separator plate assembly 62 is bounded by gaskets 128 on both the first side and second sides 112,114 of the separator plate 62. The gaskets 128 isolate the cathode side 70 of the separator plate 62, both electrically and physically, from the rest of the stack.

With renewed reference to FIG. 2, the fluid distribution means 72 serves multiple functions, including distributing gaseous reactants to the MEA 64 and moving liquid along the cathode side 70 of the MEA 64. The wicking material rows 104 (FIG. 3) facing the cathode 70 provide a conduit for transporting liquids from wet to dry regions along each of the individual wicking material rows 104. Further, the wicking material rows 104 are connected to the header 124 that facilitates ingress and egress of liquid into and out of the fuel cell 63. One preferred aspect of the present invention includes the ability to move the water or liquid over the entire surface of separator plate assembly 62, by non-mechanical means (i.e. by wicking action facilitated by the capillary forces within the wicking material, without need for an external pumping or pressurization) to allow for regulation of the liquid within the cell 63. The regulation of liquid transport is achieved by equilibrium driving forces between relatively dry and wet areas within the wicking material. Liquids are wicked away from areas of high concentration along the cathode face 70 to areas of lower concentration along the rows of wicking material 104.

Further, as described herein, the liquid water transported along the wicking material is used to cool the fuel cell due to the endothermic latent heat of vaporization of the water. In most operating circumstances, the water generated at the cathode 70 (FIG. 2) is insufficient to achieve the necessary cooling. The heat generated during normal operations generally exceeds the cooling effects provided by the heat of vaporization of the product water. Thus, unless a region experiences localized cooling, or the cell is under start-up conditions where heat is used to increase the thermal mass of the stack, there will be a need to cool the cell by introducing external water for vaporization. As the water is evaporated, the wicking material will draw additional liquid from the liquid reservoir 56 (FIG. 1) to the fuel cell 63 via the header 124 and into the wicking material rows 104 to provide additional necessary cooling effects.

Wicking material selected for the present invention is preferably a porous material. A porous material has a wicking rate, which is dependent upon both the pore size and permeability of the material. The pore diameter of a felted fiber porous material can be found by $$d_{pore} = \frac{d}{2(1-\varepsilon)} \quad \text{(Equation 1)}$$

where d is the fiber diameter and $\varepsilon$ is the void fraction of the material with the void fraction being defined by $$\varepsilon = \frac{\text{void volume in material}}{\text{total volume of material (solids + voids)}}. \quad \text{(Equation 2)}$$

A capillary pressure (differential pressure $dP_{cap}$) is generally determined in a porous material by the following equation $$dP_{Cap} = \frac{4\sigma \cos\theta}{d_{pore}} \quad \text{(Equation 3)}$$

where $\sigma$ is the surface tension of water, $\theta$ is the wetting angle, and $d_{pore}$ is the pore diameter. As can be observed, the pore diameter is inversely proportional to the capillary pressure. A larger pore diameter decreases the capillary pressure. The wicking velocity (or volume flowrate of liquid per unit area—$V_{wick}$) is generally determined by $$v_{wick} = \frac{K(dP_{Cap} - dP_{flow\,field})}{\mu L} \quad \text{(Equation 4)}$$

where K is the permeability of the porous material, $dP_{flowfield}$ is the flowfield pressure drop, $\mu$ is the water viscosity, and L is the flowfield length. Thus, in order to establish a positive wicking velocity, the capillary pressure must be greater than the differential pressure across the flowfield, when cathode gas flow is countercurrent to the wicking flow. The flow of cathode gas in the gas flow channels 102 can also be concurrent, or in the same direction, as the wicking flow (from proximal side 108 to distal end 106, or in an opposite direction to the flow patterns shown in FIG. 3) so that the flowfield pressure drop adds to the capillary pressure to assist the wicking flow.

Depending on the physical configuration of the stack, a column height pressure may also be added to the differential pressure value to account for the water column height and its effect on the wicking velocity. The water may be added at the top of the stack, so the water column will also assist the wicking flow. Although increasing the differential capillary pressure is desirable for increasing the velocity of wicking, other factors also must be accounted for in the material selection. For instance, increasing the permeability value also has the effect of increasing the wicking velocity. Permeability is given by $$K = \frac{6 \times 10^{-10}(X^2 - 1)}{(X^2 + 1)} \quad \text{(Equation 5)}$$

where $$X = 1 + \frac{8.2 \times 10^6 d^2 \varepsilon^2}{(1 - \varepsilon)^2} \quad \text{(Equation 6)}$$

and d is the fiber diameter (in meters) and $\varepsilon$ is the void fraction. Hence, permeability of the material (K) is a function of the pore diameter; as pore diameter increases so does the permeability. A greater permeability of the material also increases the wicking velocity.

Material pore size (i.e. fiber diameter and void fraction) selection may be dependent on the range of differential pressures across the flow field 100. Tolerance levels for the differential pressure across the flow field 100 are determined by various system parameters including membrane 66 integrity, partial pressures of reactants, and system handling capability. Selection of the wicking material optimizes the pore size to increase the wicking velocity to a maximum amount, over the range of pressure differentials encountered during operating conditions. Preferred ranges of pore size diameter in wicking materials are within the range of about 5 to about 30 μm. Preferably the void fraction ranges from about 60 to 80%.

Figure 4:
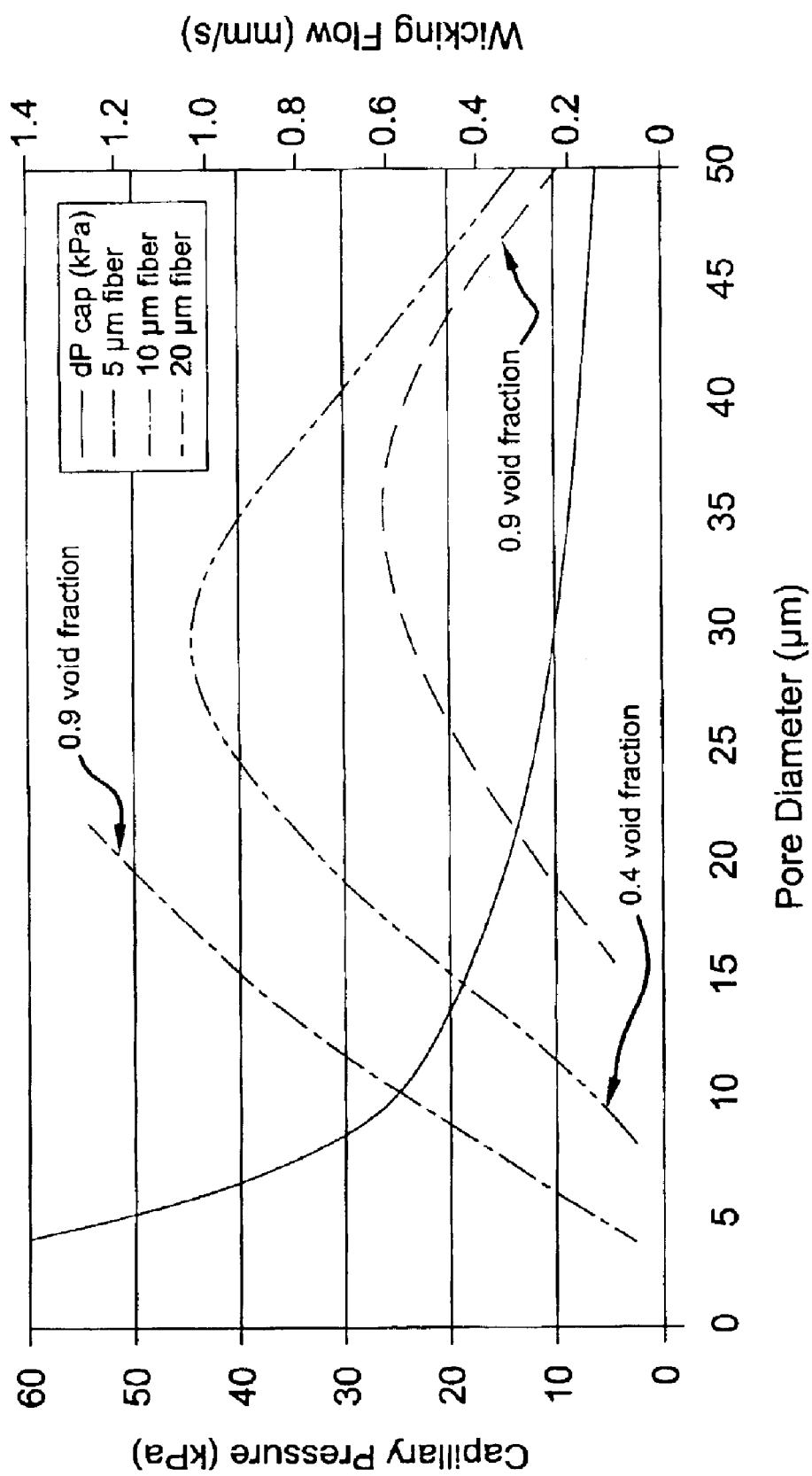
FIG. 4 is a graph of capillary pressure and wicking flow rate versus pore size of wicking material.

The general relationship between pore size, capillary pressure, and wicking velocity is shown in FIG. 4, where the pressure drop across the flow field (a length of 90 mm) is assumed to be constant at 5 kPa. The graph shown in FIG. 4 demonstrates the selection process for wicking material and is merely exemplary, and not limiting as to pore size ranges, pressures, or wicking velocities. Capillary pressure and wicking flow velocity is plotted versus pore diameter. Porous materials made of fibers of different diameters resulted in three distinct curves (i.e. 5 μm, 10 μm, and 20 μm fibers), with each curve covering a range of void fractions between 0.4 to 0.9 as indicated in FIG. 4. Thus, material selection includes optimizing both the permeability and capillary pressure. In the present example shown in FIG. 4, the 5 μm fiber (with a void fraction of 0.9) results in the maximum wicking velocity (approximately 1.2 mm/s).

The cross-sectional area and the length of the material also impacts the needed wicking velocity. As the length of the wicking material rows becomes greater, transport of the water through the material becomes increasingly difficult. The wicking material is preferably consistently wetted, and water needs to be transported at the same rate that water evaporates to ensure consistent wetting. When considering that quantity of water that must be transported for a specific fuel cell, the wicking velocity of the material dictates the requisite wicking material cross-sectional area. Thus, the material cross-section may be smaller for larger wicking velocities and must be greater for smaller wicking velocities, with the ultimate object of ensuring sufficient and even distribution of the liquid throughout the body of the wicking material during operating conditions. Preferred dimensions of each wicking material row are from about 0.2 mm to 1 mm in a "z" direction (as shown in FIG. 2) and from about 0.5 to 2 mm wide in a "x" direction. Further, the wicking material is also selected to have a good thermal conductivity values which are preferably greater than $$2\frac{W}{m \cdot K}.$$

This is necessary for heat transfer between the MEA and the wicking material to facilitate vaporization of the liquids. Thus, factors that are important in the selection process of wicking material include the wicking velocity of the material determined by the pore size (and void fraction), the hydrophobic and hydrophilic properties of the material; whether the material efficiently transports water throughout the body, as well as the thermal and electrical conductivity.

In certain preferred embodiments of the present invention, the wicking material is conductive and forms an electrically conductive pathway between the impermeable conductive layer 80 and the cathode 70. Conductive porous materials are well known in the art, and may be selected from the group consisting of: fiber mats, fiber cloths, woven cloths, papers, sintered metals, mesh, screen, metal foams, sprayed metal powders, polymers with conductive particles dispersed therein, and mixtures and equivalents thereof. Such porous materials may comprise, for example, carbon, graphite, conductive metals including stainless steel, chrome, and equivalents thereof. Frequently, such porous conductive materials may be further surface treated to enhance the hydrophilicity of the pores to facilitate water transport internally through the pores.

If an electrically conductive polymer is selected for the wicking material, preferably it has a resistivity not greater than about 500 mOhm-cm, and preferably from about 50 to 500 mOhm-cm. Such polymeric material is preferably in the form of a foam or other construction such as woven or non-woven fibers providing flow passages therethrough. Depending on the characteristics of the polymer selected, the polymer may optionally further comprise electrically conductive particles (i.e., less than about 50 μm) dispersed throughout forming a polymer matrix. The conductive particles are selected from the group consisting of: graphite, carbon, nickel, conductive metal borides, niobium, nitrides and carbides (e.g., titanium nitride, titanium carbide, titanium diboride), and titanium alloys containing chromium and/or nickel, and equivalents thereof. Most preferably, the particles will comprise carbon or graphite (i.e., hexagonally crystallized carbon). If foams are used, preferably, the foam is an open cell conductive graphite foam or metallic foam.

As previously discussed, materials of construction for the liquid header 124 are similar to those of the wicking material rows 104 (as shown in FIG. 2). However, the liquid header 124 is non-conductive, in order to provide electrical isolation between separator plate assemblies (see 16, 18 of FIG. 1, for example), preventing so called "shunt currents" from occurring between cells outside of an active area 122 of the separator plate assembly 62. The impermeable electrically conductive element 80 may comprise two distinct surface regions: a major surface corresponding to the active area 122 and an exterior surface region 125, that is adjacent to the active area 122. The active area 122 is generally centrally located with respect to the exterior surface region 125. The active area 122 may be completely circumscribed by the exterior surface region 125, or may only be bounded on a single or pair of sides (as shown in FIG. 3). A preferred aspect of the present invention includes making the exterior surface region 125 of the electrically conductive element 80 non-conductive, either by forming it from non-conductive material and attaching it to the conductive active area 122, or by treating or coating the exterior surface region 125 to render it electrically non-conductive. A non-conductive exterior surface region 125 is beneficial for reducing shunt currents. Further, the wicking material 104 may extend into the exterior surface region 125 outside the active area 122, and may be selected to be non-conductive in the areas where it covers the exterior surface region 104 according to the principles discussed above for the non-conductive header 124 and serves to further minimize shunt currents between cells.

The porosity of the header 124 wicking material is governed by same principles as those of the wicking material rows 104, and maximizing the wicking velocity is a goal in material selection. However, the differential pressure value is measured from the second side 114 of the separator plate 62 on the proximal end 108 where the header 124 enters the cathode effluent duct 120 to the first side 112 of the proximal end 108 of the separator plate assembly 62. Porous non-conductive wicking material may be selected from the group consisting of: sintered non-conductive particles, fibers, woven or non-woven cloth, mats, flock, polymers, polymeric foam, coatings or the like. Preferred materials include olefin polymer fibers (e.g. polypropylene), cellulose fibers, polybutylacrylate foam, and polyamideimide porous coating, for example. Often, non-conductive polymers include reinforcing materials, such as non-conductive reinforcing materials which may include: polyesters, polypropylenes, acrylics, glass, cotton, quartz, and mixtures and equivalents thereof.

During operation of the fuel cell, the PEM must be humidified to maintain good proton conductivity, and one aspect of the present invention provides such humidification by maintaining a saturated cathode effluent gas. The water vapor saturation level of the cathode effluent gas is preferably approximately 100% relative humidity. Additional constituent liquids may be present in small concentrations in the water, such as contaminants or additives (e.g. antifreeze compounds). Heat generated within the fuel cell 63 provides the latent heat of vaporization for the liquid water within the wicking material on the cathode side 70 of the fluid distribution means 72. The saturation of the cathode effluent stream 50 enables the PEM 66 to be appropriately humidified during operation. Further, the vapor in the saturated cathode effluent stream 50 can be recovered downstream in the condenser 54 (FIG. 1).

As previously discussed, PEM fuel cells often generate excess heat during operations, which may result from, for example, electrochemical and exothermic combustion reactions of the oxidant and fuel (the latter occurring in addition to the electrochemical reduction-oxidation reaction). As previously discussed, the prior art methods of cooling the stack typically comprise circulating coolant into and out of each fuel cell, where the excess heat is transferred into the coolant through the metal plates, and removed from the stack. The present invention provides a self-regulating method of cooling the fuel cell 63 during operation, and eliminates the recirculating cooling loop. As previously discussed, the latent heat of vaporization for water is relatively high, for example, at 25° C. and 101.325 kPa the value is 44,020 KJ/kg mol. Thus conversion of liquid water in the wicking material to vapor phase removes significant heat from the system. The rate of heat removal depends on the rate of vaporization. As product water is generated at the cathode 70, the wicking material rows 104 wick away any localized areas of liquid and collect and retain the liquid to prevent localized flooding. The liquid in the wicking material may be wicked away to drier areas along the wicking material row 104 although during normal operations there is enough heat present to convert the water to vapor phase (steam).

Water from an external source (aside from the product water generated at the cathode) is supplied by the liquid reservoir 56 through the header 124 to each individual row 104. As previously discussed, the wicking material is selected such that liquid transport may be achieved within the fluid distribution means 72 solely by wicking action. The wicking action equilibrates the liquid concentration between the relatively wet areas to the dry areas. When there is excess heat, the water vaporizes from the wicking material rows, reducing liquid water concentration. The wicking material becomes relatively dry and draws additional water to the region. In turn, liquid is transported from the header 124 into the wicking material row 104, replenishing the water in the wicking material rows 104 as needed. The volumetric rate of transport of the water is dependent upon the rate of vaporization or evaporation, which in turn depends on the heat generated.

Another aspect of the present invention is a recycling loop for the cooling water. The heat generated correlates to the overall activity of the reaction in the MEA 64 and the amount of vapor in the cathode effluent 50 likewise increases. The condenser 54 recovers the vapor and coverts it to liquid, which is available for transport back into the fuel cell 63. As the need for cooling effects are increased, the amount of water recovered and available for returning to the fuel cell 63 via the header 124 and wicking material is also increased. In alternate preferred embodiments of the present invention, an external liquid or water source 56 may be provided to supplement the liquid reservoir volume, or may entirely replace the condenser 54 and reservoir 56 system and provide fresh coolant water to the cell.

With renewed reference to FIG. 3, a configuration of the separator plate assembly 62 includes the distal end 106 being elevated above the proximal end 108. The liquid is thus wicked upwards against gravity, and countercurrent to the gas flow in the flow field 100. The cathode inlet duct 110 introduces air or oxygen with relatively low humidity (depending on the inlet temperature and pressure, the actual humidity level may vary). The wicking material rows 104 extend beyond the active area 122, in order to create an additional interface zone 130 where moisture can be released from the wicking material into the cathode inlet gases prior to encountering the MEA 64 (FIG. 2) in the active area 122. The humidified cathode gases provide a durability benefit to the MEA, because exposure to dry gases can be detrimental to structural integrity. In this embodiment, the wicking material is supplied with water both in the regions of the cathode where the product water is generated within the active area 122, and also along the header region 124 in the proximal end 108. As the relatively dry gas travels through the inlet duct 110 and into the individual flow channels 102, water will evaporate. The rate of evaporation is driven by, for example, the pressure of the flow field 100, the relative humidity of the incoming gas, and the temperature within the fuel cell 63. As the water is gradually evaporated from the proximal end 108 to the distal end 106 of the wicking material rows 104, water is wicked or drawn in a direction extending from the wet regions up to the dry regions. Preferably, the wick is fully wet, and the wicking velocity decreases from the proximal end 108 to the distal end 106 as the water evaporates.

One perceived advantage of the present invention pertains to simplified flow field channel patterns. The gas flow field channels may comprise linear rows, as where in the prior art, the flow field channels have typically had complex patterns (e.g. serpentine flow field patterns). These complex flow fields were typically formed to accommodate ducts for three fluids (hydrogen, air and coolant). However, by elimination of an additional underlying coolant loop and an alternate cooling methods according to the present invention, the flow field patterns need only be straight rows. Straight flow channels permit a lower differential pressure across the flow field, and increase operational efficiency.

Figure 5:
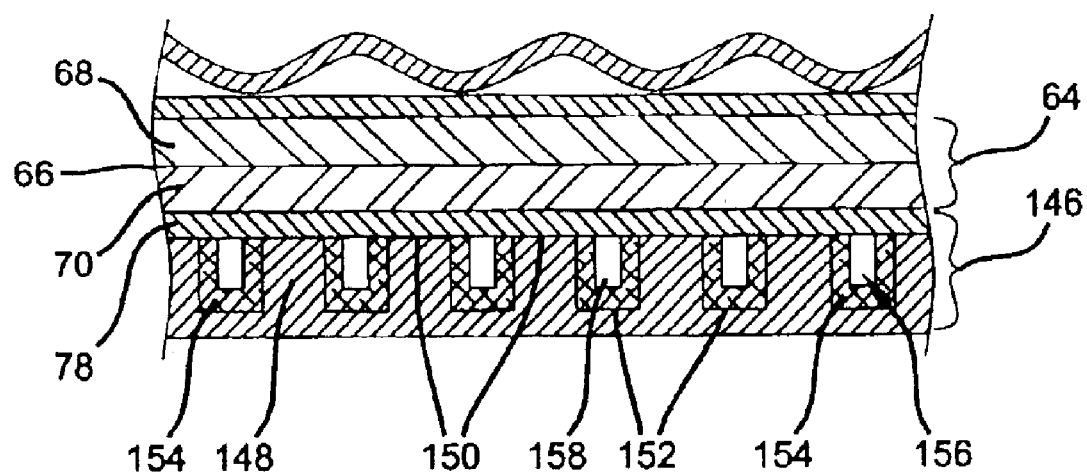
FIG. 5 is a partial cross-sectional view of an alternate preferred embodiment of the present invention of a fluid distribution means on a cathode side of a MEA comprising non-conductive wicking material.

An alternate preferred embodiment of the present invention is shown in FIG. 5, which includes a non-conductive wicking materials. The configuration of such a fluid distribution means 146 includes a conductive impermeable layer 148 having metal lands 150 with grooves (i.e. channels) 152 interspersed therebetween. The metal lands 150 establish electrical contact between a conductive diffusion media sub-layer 78 which touches the cathode 70 and the impermeable conductive layer 148. The MEA 64 has the same configuration as the embodiments described above. The wicking material rows 154 are placed within the grooves or channels 152 of the conductive impermeable layer 148 and conform to the shape of the grooves 152. Further, a central portion 156 of the wicking material row 154 has a void or empty inner channel, which forms the gas flow channel 158. Thus, the shape of the wicking material row 154 may vary from a semi-tubular (arcuate shape) to a semi-rectangular or "U" shape to a tubular or rectangular shape with a void in the inner portion. As shown in the present embodiment, the wicking material is adjacent to the porous diffusion media layer 78. However, in alternate preferred embodiments not shown, the porous diffusion layer 78 need not be included, and may comprise the wicking material directly adjacent to the cathode material 70.

Figure 6:
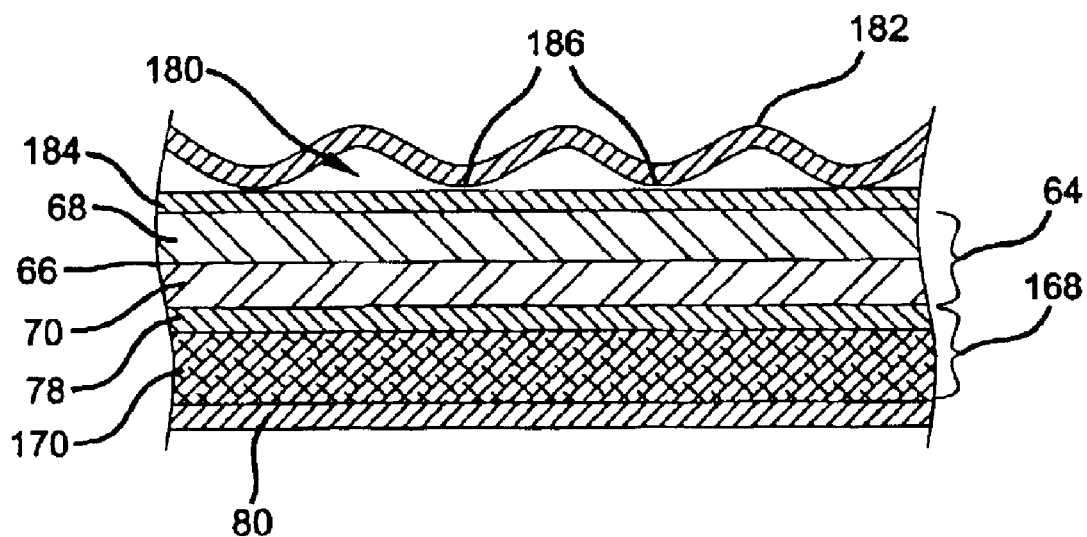
FIG. 6 is a partial cross-sectional view of an alternate preferred embodiment of the present invention of a solid porous layer of wicking material on a cathode side of a MEA.

In another preferred alternate embodiment of the present invention, the fluid distribution means 168 comprises wicking material in a porous solid layer 170 as shown in FIG. 6. The porosity of the wicking materials enables both gas and liquid to flow through a solid porous layer 170, so that it serves both as the gas distribution channels and the liquid wicking channels. Gas is delivered to the MEA 64 from the fluid distribution means 168 through the layer of porous wicking material 170. As shown in FIG. 6, the solid layer 170 is adjacent to the impermeable conductive layer 80. The fluid distribution means 168 optionally further comprises a porous diffusion media 78, which may provide another layer of porous material to distribute the gas to the MEA 64. In the present embodiment, the entire fluid distribution means 168 comprises conductive material, including both the solid porous layer 170 and the porous diffusion media layer 78. Distinct channels to separate gas and liquid within the wicking material solid layer may be formed by treating certain regions of the solid porous layer 170 to be hydrophilic (i.e. forming water pathways through the porous body) and other regions are hydrophobic (i.e. forming gas pathways). Further, pathways of gas and liquid may be delineated from one another by different pore sizes, with one range of pore sizes facilitating liquid wicking, and another gas flow.

Figure 7:
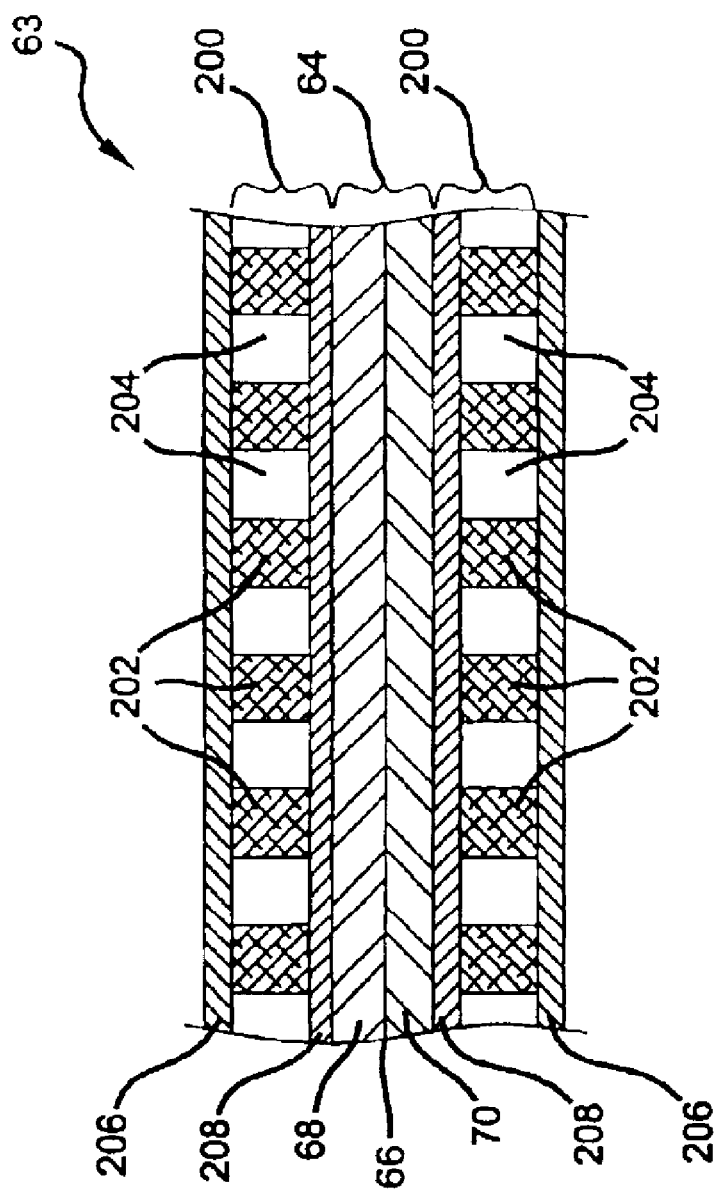
FIG. 7 is a partial cross-sectional view of an alternate preferred embodiment of the present invention of a fluid distribution means on both a cathode and an anode side of a MEA.

As depicted in the previous embodiments and shown in FIG. 6, the anode 68 has been formed by a traditional flow field 180, having a flow field 180 formed in a separator plate 182 and conductive diffusion media 184 touching the lands 186 of the conductive metal separator plate 182. In another preferred alternate embodiment of the present invention, the separator plate assembly and fluid distribution means according to the present invention may be included on both the anode side 68 of the fuel cell 63, as well as the cathode side 70, as shown in FIG. 7. The anode side 68 does not have the same issues with liquid water management as the cathode side 70, in that product water is generated only on the cathode side 70. In the previous embodiments described above, the fluid distribution means comprising the wicking material helps to collect liquid water, redistribute to dry areas along the cathode side 70, humidify the PEM 66, and cool the fuel cell 63. Humidification of the PEM 66 along the anode side 68 is generally sufficient, as the width of a typical membrane 66 does not prohibit water vapor from moisturizing both sides of the membrane 66 (e.g. typical widths are approximately 15 $\mu$m). However, if additional humidification is necessary along the anode side 68, or additional cooling, a similar fluid distribution means 200 may be placed adjacent to both the anode and the cathode sides, 68,70 in lieu of a traditional flow field on the anode side 68.

Thus, both the anode and cathode side 68,70 have wicking material rows 202 with gas flow channels 204 therebetween. Each side 68, 70 has a conductive impermeable layer 206. Further, conductive diffusion media 208 may optionally be placed between the wicking material rows 202 and the anode and cathode 68,70 to facilitate even gas distribution. Any configuration of fluid distribution means 200 is feasible with the present embodiment, and the anode and cathode side 68,70 may be different embodiments of the fluid distribution means 200. As shown in FIG. 7, the fluid distribution means 200 and wicking material configurations are the same, and similar to the embodiment shown on the cathode side 70 only in FIG. 2. Headers (not shown) connect the wicking material rows 202 to a liquid reservoir 56 and provide water as described in previous embodiments.

The present invention integrates various aspects of water management within the cathode side of the fuel cell, including prevention of flooding within the electrode, humidification of the PEM membrane, and overall cooling of the fuel cell. The fluid distribution means according to the present invention, comprising wicking material, provides a self-regulated cooling and water management system, where on the cathode side, the water is internally distributed within the wicking material of each wicking material row. As cooling within the fuel cell is necessary, the liquid is automatically evaporated (at a rate needed to cool the fuel cell) and replenished by a liquid source via a header. Further, the present invention avoids having to externally pump the liquid through and out of the cell for cooling, and serves to recycle the water generated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A separator assembly for an electrochemical cell which has an anode and a cathode, said assembly comprising:
   an impermeable electrically conductive element having a major surface facing the cathode;
   fluid distribution means between said electrically conductive element and said cathode, said fluid distribution means defining gas flow channels, and comprising liquid wicking material;
   a header comprising a liquid reservoir in contact with a proximal end of said fluid distribution means; and said fluid distribution means and said header constructed and arranged to provide movement of liquid from said liquid reservoir to and through said fluid distribution means and toward a distal end of said fluid distribution means.

2. The assembly of claim 1, wherein said liquid has an endothermic heat of vaporization, whereby said liquid extracts heat from said cathode by vaporization.

3. The separator assembly of claim 2, wherein the electrochemical cell further comprises an MEA, and said vaporization further humidifies said MEA.

4. The separator assembly of claim 3, wherein said wicking material forms an electrically conductive path between said MEA and said impermeable electrically conductive element.

5. The separator assembly of claim 3, wherein said fluid distribution means internally re-distributes water thereby minimizing differences in humidity along a face of said MEA.

6. The separator assembly of claim 1, wherein a plurality of conductive lands protrude from said impermeable electrically conductive element and create an electrically conductive path between either said anode or said cathode and said impermeable electrically conductive element.

7. The separator assembly of claim 1, wherein water is generated at the cathode and wicked away from the cathode by said wicking material.

8. The separator assembly of claim 1, wherein a second fluid distribution means is disposed between said element and the anode, said second fluid distribution means defining gas flow channels, and comprising liquid wicking material;
   a second header comprising a liquid reservoir in contact with a proximal end of said second fluid distribution means; and
   said second fluid distribution means and said second header constructed and arranged to provide movement of liquid from said liquid reservoir to and through said second fluid distribution means and toward a distal end of said second fluid distribution means.

9. The separator assembly of claim 1, wherein said wicking material is selected from the group consisting of: fiber mats, fiber cloths, woven cloths, papers, sintered metals, mesh, screen, metal foams, sprayed metal powders, polymers with conductive particles dispersed therein, and mixtures and equivalents thereof.

10. The separator assembly of 9, wherein said wicking material comprises a compound selected from the group consisting of: carbon, graphite, stainless steel, chrome, and alloys and mixtures thereof.

11. The separator assembly of claim 1, wherein said electrically conductive element has said major surface facing the cathode and an exterior surface region, wherein said major surface is centrally located on said element and adjacent to said exterior surface region, wherein said fluid distribution means extends over both said major surface and at least a portion of said exterior surface region to facilitate humidification of gas entering the cathode.

12. The separator assembly of claim 1, wherein said electrically conductive element has said major surface facing the cathode and an exterior surface region, wherein said major surface is centrally located on said element and adjacent to said exterior surface region, wherein said major surface is electrically conductive and said exterior surface region is non-conductive to reduce shunt currents.

13. The separator assembly of claim 1, wherein said wicking material is non-conductive.

14. The separator assembly of claim 13, wherein said non-conductive wicking material is selected from the group consisting of: sintered non-conductive particles, fibers, woven or non-woven cloth, mats, flock, polymers, polymeric foam, and mixtures and equivalents thereof.

15. The separator assembly of claim 14, wherein said non-conductive wicking material comprises a compound selected from the group consisting of: olefin polymers, polypropylene, cellulose, polybutylacrylate, polyamideimide, and mixtures and equivalents thereof.

16. The separator assembly of claim 1, wherein said wicking material comprises pores and said pores have a size the range of from about 5 $\mu$m to about 50 $\mu$m.

17. The separator assembly of claim 1, wherein said impermeable conductive element comprises a compound selected from the group consisting of: aluminum, titanium, stainless steel, and alloys and mixtures thereof.

18. The separator assembly of claim 1, wherein gases flowing within said gas flow channels are saturated with vapor.

19. The separator assembly of claim 1, wherein said saturated vapor gases are condensed and collected in said liquid reservoir.

20. A method for cooling an electrochemical fuel cell comprising:
   introducing reactant gases to respective anode and cathode sides of the fuel cell;
   conducting an electrochemical reaction in the fuel cell thereby generating heat;
   transporting water to relatively dry areas of the cathode side by means of a wicking material disposed in gas flow channels, wherein said wicking material is in fluid communication with a water source; and
   evaporating water from said wicking material by said generated heat, thereby cooling the fuel cell.

21. The method according to claim 20, further comprising a step of recovering said evaporated water by condensation wherein said recovered water supplements said water source.

* * * * *